United States Patent
Tirthapura et al.

(10) Patent No.: US 9,152,688 B2
(45) Date of Patent: Oct. 6, 2015

(54) SUMMARIZING A STREAM OF MULTIDIMENSIONAL, AXIS-ALIGNED RECTANGLES

(71) Applicants: International Business Machines Corporation, Armonk, NY (US); Iowa State University Research Foundation, Inc., Ames, IA (US)

(72) Inventors: Srikanta N Tirthapura, Ames, IA (US); David P Woodruff, Mountain View, CA (US)

(73) Assignees: International Business Machines Corporation, Armonk, NY (US); Iowa State University Research Foundation, Inc., Ames, IA (US)

(*) Notice: Subject to any disclaimer, the term of this patent is extended or adjusted under 35 U.S.C. 154(b) by 288 days.

(21) Appl. No.: 13/791,472

(22) Filed: Mar. 8, 2013

(65) Prior Publication Data

US 2014/0258253 A1   Sep. 11, 2014

(51) Int. Cl.
G06F 17/30 (2006.01)

(52) U.S. Cl.
CPC .... *G06F 17/30592* (2013.01); *G06F 17/30333* (2013.01)

(58) Field of Classification Search
None
See application file for complete search history.

(56) References Cited

U.S. PATENT DOCUMENTS 7,761,403 B2   7/2010   Witkowski et al.
7,809,712 B2  10/2010   Witkowski et al.

OTHER PUBLICATIONS

Sharma, Gokarna, Costas Busch, and Srikanta Tirthapura. "A streaming approximation algorithm for Klee's measure problem." CoRR, abs/1004.1569 (2010).*

Sharma et al., "An Efficient Transformation for the Klee's Measure Problem in the Streaming Model," in CCCG, pp. 83-88, Aug. 8-12, 2012.*

Bringmann et al., "Approximating the volume of unions and intersections of high-dimensional geometric objects," Algorithms and Computation, Springer Berlin Heidelberg, 2008.*

Nene et al. "A Simple Algorithm for Nearest Neighbor Search in High Dimensions" IEEE Transactions on Pattern Analysis and Machine Intelligence, vol. 19, Issue 9, (Sep. 1997), pp. 989-1003.

Pavan et al. "Range-Efficient Counting of Distinct Elements in a Massive Data Stream" SIAM Journal on Computing, vol. 37, No. 2, (2007), pp. 359-379.

(Continued)

*Primary Examiner* — Jay Morrison
(74) *Attorney, Agent, or Firm* — Jeffrey T. Holman

(57) ABSTRACT

A method for estimating aggregates over a stream of axis-aligned rectangles, includes: decomposing the stream along one-dimensional intervals, wherein vertices for the rectangle are located in a predetermined grid; assigning each grid row to buckets, wherein the one-dimensional intervals are placed into buckets according to the corresponding rows in which the one-dimensional intervals are positioned; and estimating a sum of a number of grid points touched by at least one of the rectangles in each row of the grid to approximate a volume of the axis-aligned rectangles by: using pairwise-independent hash functions in a multi-dimensional algorithm to determine buckets that include a first interval corresponding to a given rectangle, wherein the interval has hash function results that meet a predetermined threshold; and inserting a second interval for the rectangle corresponding to the first interval into a one-dimensional algorithm for the corresponding bucket meeting the predetermined threshold.

20 Claims, 4 Drawing Sheets

(56) References Cited

OTHER PUBLICATIONS

Tirthapura et al. "Approximating the Klee's Measure Problem on a Stream of Rectangles" 24 pages.

Vahrenhold "An In-Place Algorithm for Klee's Measure Problem in Two Dimensions" Information Processing Letters, vol. 102, Issue 4, (May 2007), pp. 169-174.

Andoni et al. "Efficient Sketches for Earth-Mover Distance, with Applications" 50th Annual IEEE Symposium on Foundations of Computer Science, (Oct. 2009), pp. 324-330.

Andoni et al. "Streaming Algorithms via Precision Sampling" IEEE 52nd Annual Symposium on Foundations of Computer Science (FOCS), (2011), 27 pages.

Bar-Yossef et al. "Reductions in Streaming Algorithms, with an Application to Counting Triangles in Graphs" Proceedings of the Thirteenth Annual ACM-SIAM Symposium on Discrete Algorithms, (2002), 11 pages.

Chen et al. "Space Efficient Algorithms for Klee's Measure Problem" Proceedings of the 17th Canadian Conference on Computational Geometry, (2005), pp. 27-30.

Das et al. "Approximation Techniques for Spatial Data" Proceedings of the 2004 ACM SIGMOD International Conference on Management of Data, (2004), 12 pages.

Devroye "Lecture Notes on Bucket Algorithms" Book by Birkhauser Boston, ISBN 081763386, (1985-1986), 76 pages.

Indyk et al. "Optimal Approximations of the Frequency Moments of Data Streams" Proceedings of the Thirty-Seventh Annual ACM Symposium on Theory of Computing, (2005), pp. 202-208.

Kane et al. "An Optimal Algorithm for the Distinct Elements Problem," Proceedings of the Twenty-Ninth ACM SIGMOD-SIGACT-SIGART Symposium on Principles of Database Systems, (2010), pp. 41-52.

Michel et al. "Klee: A Framework for Distributed Top-k Query Algorithms" Proceedings of the 31st VLDB Conference, (2005), 12 pages.

Monemizadeh et al. "1-Pass Relative-Error Lp-Sampling with Applications" Proceedings of the 21st Annual ACM-SIAM Symposium on Discrete Algorithms, (2010), pp. 1143-1160.

\* cited by examiner

SUMMARIZING A STREAM OF MULTIDIMENSIONAL, AXIS-ALIGNED RECTANGLES

STATEMENT OF FEDERALLY SPONSORED RESEARCH

This invention was made with Government support under Grant No. 0831903 awarded by The National Science Foundation and Grant No. 0834743 awarded by The National Science Foundation. The Government has certain rights to this invention.

BACKGROUND

The management of spatial and geometric data rises in various settings, including geographic database systems, astronomy, and very large scale integration (VLSI) design, among others. A spatial database system supports storing, indexing and fast querying of geometric objects. Spatial databases may deal with large collections of relatively simple geometric objects, such as lines, curves, and polygons in space. An important class of objects in spatial databases is rectangles in two or more dimensions.

In the data stream model of computation, an algorithm generally processes data in a single pass and with limited additional workspace. Some advantages of one-pass processing include: maintaining an aggregate in an online manner from an update stream with small space overhead; and even if data is not arriving as a stream, but is stored on locally, a streaming algorithm implicitly yields a small space summary of a large set of objects that can be used to quickly answer a query, along with an approximation error guarantee.

SUMMARY

Embodiments of a system are described. In one embodiment, the apparatus is an aggregate approximation system. The system includes: a receiver configured to receive a stream of data represented by a plurality of axis-aligned rectangles along one-dimensional intervals; a volume estimator configured to: decompose the stream of data, wherein all vertices for each rectangle are located in a grid having a predetermined area; assign each row in the grid to one of a plurality of buckets, wherein the one-dimensional intervals for each rectangle are placed into the buckets according to the corresponding rows in which the one-dimensional intervals are positioned; maintain an instance of a one-dimensional algorithm in each bucket; and estimate a sum of a number of grid points touched by at least one of the rectangles in each row of the grid to approximate a volume of the axis-aligned rectangles by: using pairwise-independent hash functions in a multi-dimensional algorithm to determine buckets that include an interval corresponding to a given rectangle, wherein the interval has hash function results that meet a predetermined threshold; and inserting the interval for the rectangle into the one-dimensional algorithm for the corresponding bucket having hash function results that meet the predetermined threshold. Other embodiments of the apparatus are also described.

Embodiments of a method are also described. In one embodiment, the method is a method for estimating aggregates over a stream of axis-aligned rectangles. The method includes: decomposing a stream of data represented by a plurality of axis-aligned rectangles along one-dimensional intervals, wherein all vertices for each rectangle are located in a grid having a predetermined area; assigning each row in the grid to one of a plurality of buckets, wherein the one-dimensional intervals for each rectangle are placed into the buckets according to the corresponding rows in which the one-dimensional intervals are positioned; maintaining an instance of a one-dimensional algorithm in each bucket; and estimating a sum of a number of grid points touched by at least one of the rectangles in each row of the grid to approximate a volume of the axis-aligned rectangles by: using pairwise-independent hash functions in a multi-dimensional algorithm to determine buckets that include an interval corresponding to a given rectangle, wherein the interval has hash function results that meet a predetermined threshold; and inserting the interval for the rectangle into the one-dimensional algorithm for the corresponding bucket having hash function results that meet the predetermined threshold. Other embodiments of the method are also described.

Embodiments of a computer program product are also described. In one embodiment, the computer program product includes a computer readable storage medium to store a computer readable program, wherein the computer readable program, when executed by a processor within a computer, causes the computer to perform operations for estimating aggregates over a stream of axis-aligned rectangles. The operations include: decomposing a stream of data represented by a plurality of axis-aligned rectangles along one-dimensional intervals, wherein all vertices for each rectangle are located in a grid having a predetermined area; assigning each row in the grid to one of a plurality of buckets, wherein the one-dimensional intervals for each rectangle are placed into the buckets according to the corresponding rows in which the one-dimensional intervals are positioned; maintaining an instance of a one-dimensional algorithm in each bucket; and estimating a sum of a number of grid points touched by at least one of the rectangles in each row of the grid to approximate a volume of the axis-aligned rectangles by: using pairwise-independent hash functions in a multi-dimensional algorithm to determine buckets that include an interval corresponding to a given rectangle, wherein the interval has hash function results that meet a predetermined threshold; and inserting the interval for the rectangle into the one-dimensional algorithm for the corresponding bucket having hash function results that meet the predetermined threshold. Other embodiments of the computer program product are described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
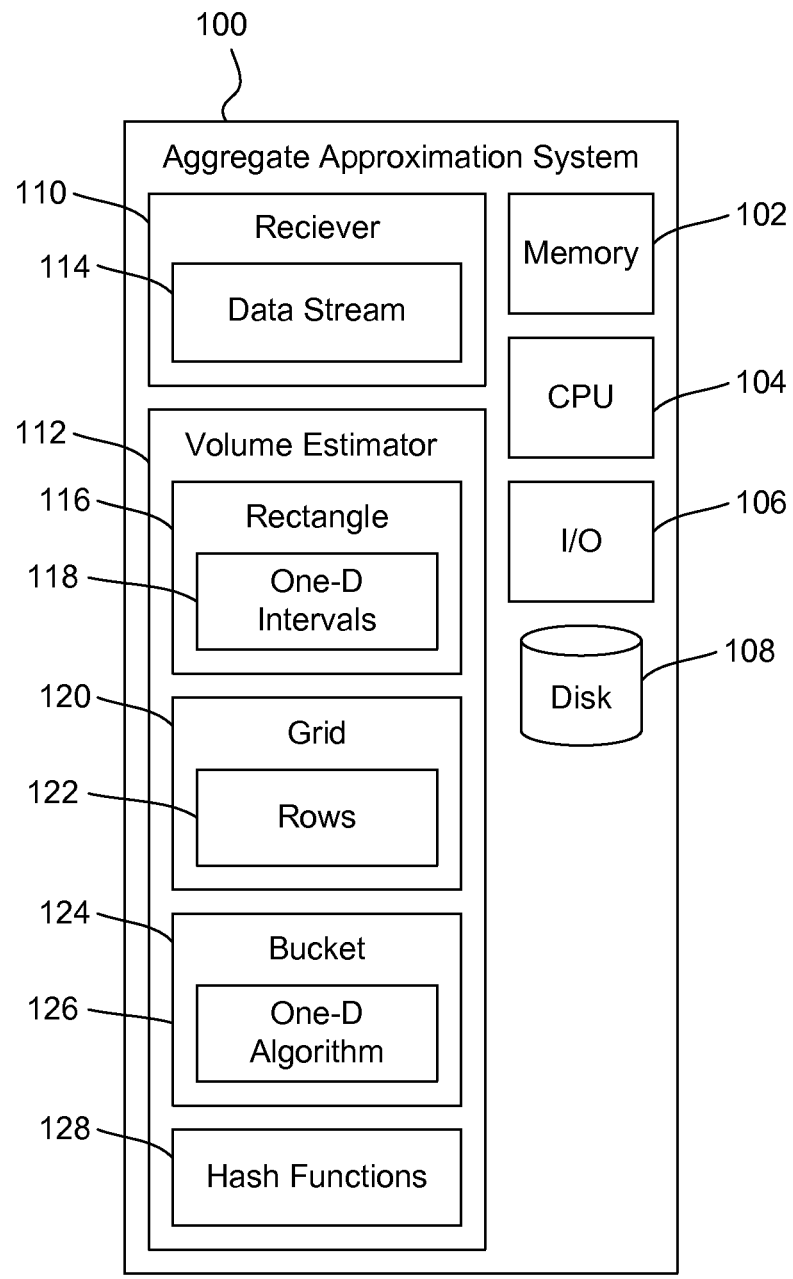
FIG. 1 depicts a schematic diagram of one embodiment of an aggregate approximation system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments present a system and method for estimating aggregates over a stream of data represented by axis-aligned rectangles. Specifically, the system includes an algorithm for Klee's measure problem in the streaming model to estimate the area or volume of the union of a stream of rectangles. More specifically, the system decomposes the data stream into one-dimensional intervals and places the intervals into a group of buckets corresponding to rows in a grid. The system then estimates the number of heavy buckets—buckets that contain at least one interval having hash function results that meet a predetermined threshold—and inserting the interval into an instance of a one-dimensional algorithm maintained in the corresponding bucket. Estimating the number of heavy buckets allows the system to determine an approximation of the volume of the rectangles in the data stream.

The approximation of a volume of the union of a stream of rectangles may be known as Klee's measure problem. In one embodiment, the system provides a $(1+\epsilon)$-approximation with high probability in an efficient manner, and with improved space usage and update time. In one embodiment, $\epsilon$ in $(0,1)$ is arbitrary, and the system may process any constant number of dimensions.

Estimating the number of distinct elements in a stream is a special case of Klee's measure problem, for which every rectangle is a single point. Some conventional methods insert each point into existing data structures, which can lead to a large update time per element because each rectangle can contain a very large number of points. Some conventional methods are able to do one-pass processing of a stream of data to estimate a number of distinct values. However, the methods are generally time prohibitive and may have a processing time proportionate to the volume of the rectangles in the data stream or longer. Implementing a non-trivial approximation method to estimate the volume of the union of rectangles without sampling all intervals or points in the rectangles improves processing speed while using a small amount of memory storage.

Figure 4:
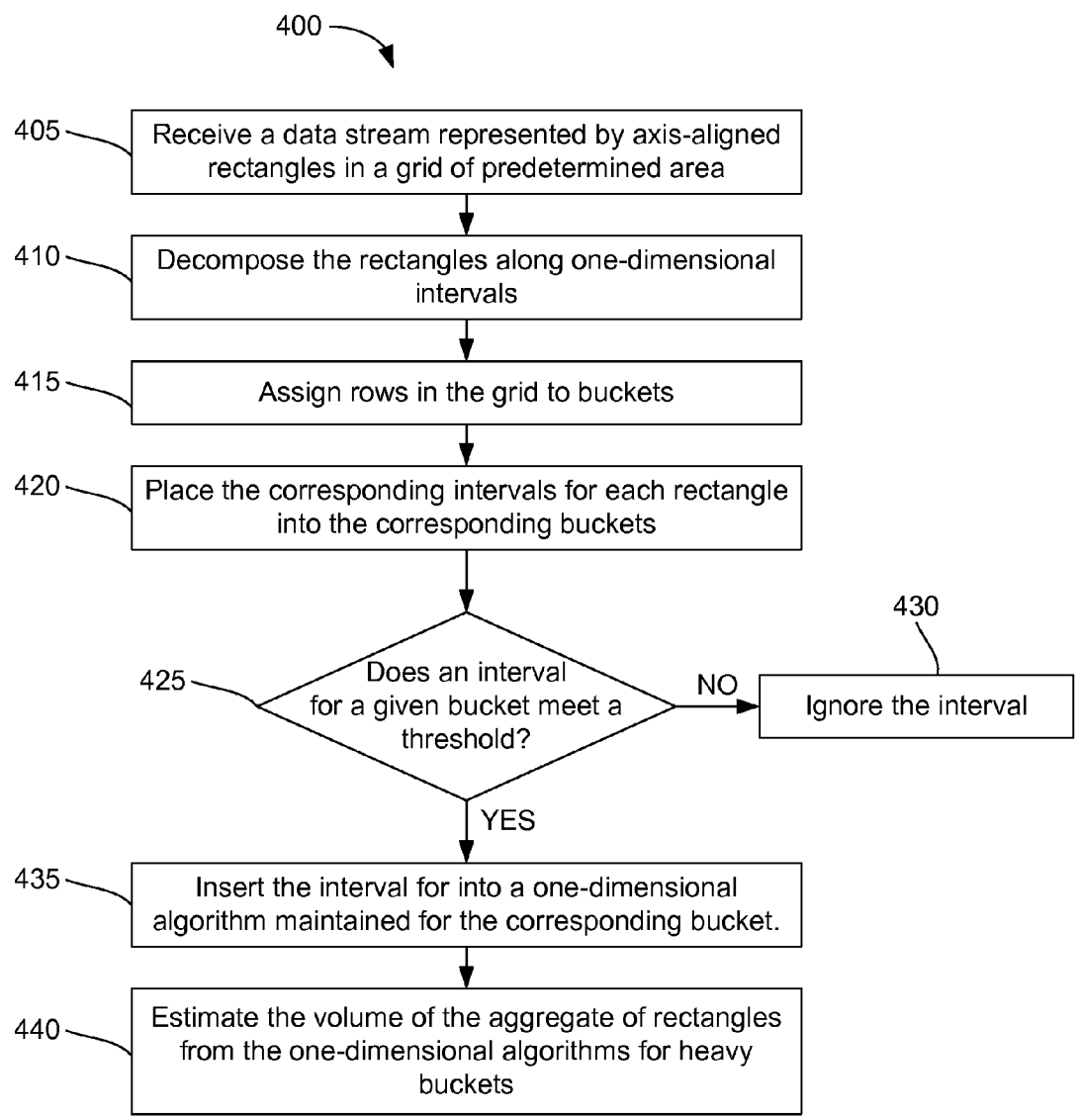
FIG. 4 depicts flowchart diagram of one embodiment of a method for estimating aggregates over a stream of axis-aligned rectangles.

FIG. 1 depicts a schematic diagram of one embodiment of an aggregate approximation system 100. The depicted aggregate approximation system 100 includes various components, described in more detail below, that are capable of performing the functions and operations described herein. In one embodiment, at least some of the components of the aggregate approximation system 100 are implemented in a computer system. For example, the functionality of one or more components of the aggregate approximation system 100 may be implemented by computer program instructions stored on a computer memory device 102 and executed by a processing device 104 such as a CPU. The aggregate approximation system 100 may include other components, such as a disk storage drive 108, input/output devices 106, a receiver 110, and a volume estimator 112. Some or all of the components of the aggregate approximation system 100 may be stored on a single computing device or on a network of computing devices, including a wireless communication network. The aggregate approximation system 100 may include more or fewer components or subsystems than those depicted herein. In some embodiments, the aggregate approximation system 100 may be used to implement the methods described herein as depicted in FIG. 4.

In one embodiment, the aggregate approximation system 100 includes a receiver 110 to receive a data stream 114. In some embodiments, the data stream 114 is represented by multiple, axis-aligned rectangles 116. The data stream 114 may be associated with a spatial database that includes geometric objects or other shapes that can be represented, at least approximately, by a union of rectangles 116. The spatial database may be any spatial database system, service or product.

In one embodiment, the aggregate approximation system 100 includes a volume estimator 112. The volume estimator 112 may estimate a volume of the union of the axis-aligned rectangles 116 from the data stream 114. In one embodiment, the system 100 is configured to receive the data stream 114 as an update stream, allowing the system 100 to perform a streaming algorithm to estimate the volume and maintain an aggregate over the data stream 114 in an online manner. In one embodiment, the aggregate approximation system 100 receives the data stream 114 and modifies the data stream 114 to represent the data as a stream of axis-aligned rectangles 116. The rectangles 116 may be any size and any number to approximate the data in the data stream 114.

The volume estimator 112 may process the received data stream 114 by decomposing the rectangles 116 in the data stream 114 into one-dimensional intervals 118. In some embodiments, the one-dimensional intervals 118 include rows of the axis-aligned rectangles 116. In other embodiments, the one-dimensional intervals 118 may include other dimensions based on the alignment of the rectangles 116 in the data stream 114. The volume estimator 112 may determine how do decompose the rectangles 116 into one-dimensional intervals 118 based on a grid 120 in which the rectangles 116 are positioned. The grid 120 may include a predetermined area with a predetermined number of points that determine potential intervals 118 in horizontal and vertical dimensions within the grid 120.

After decomposing the rectangles 116 into intervals 118, the intervals 118 may be sub-sampled into levels based on the number of rows 122 or other intervals in the grid 120. The sub-sampled intervals 118 may then be randomly hashed into buckets 124 using hash functions 128. In one embodiment, the volume estimator 112 uses pairwise-independent hash functions 128 for x and y dimensions in the grid 120 to hash the intervals 118 into buckets 124. The rows 122 in the grid 120 may be assigned randomly to buckets 124 before the receiver 100 receives the data stream 114. When the volume estimator 112 begins hashing the intervals 118 into the buckets 124, the intervals 118 may be placed into buckets 124 based on the assignment of the grid rows 122 to the buckets 124 and the location of the intervals 118 with respect to the grid rows 122. In one embodiment, the number of buckets 124 in each level is approximately $\log \Delta$, where $\Delta$ is the number of rows 122 in the grid 120. In each bucket 124, in each level, the volume estimator 112 may maintain an instance of a one-dimensional algorithm 126, which may be a known data structure for processing one-dimensional intervals 118 to determine an area of a union of the one-dimensional intervals 118.

In one embodiment, the volume estimator 112 determines which buckets 124 contain at least one interval 118 for a given rectangle 116, for with the bucket 124 has hash function results that meet a predetermined threshold. The predetermined threshold may be chosen such that system noise may be ignored or otherwise accounted for. The volume estimator 112 may find all heavy buckets 124 in each level that meet the predetermined threshold. For each heavy bucket 124 found, the volume estimator 112 may then insert the corresponding interval 118 into the one-dimensional algorithm 126 maintained in the heavy bucket 124.

In some embodiments, the aggregate approximation system 100 may include alternative or additional components to those described herein. In some embodiments, the aggregate approximation system 100 may perform alternative or additional operations to those described herein.

Figure 2:
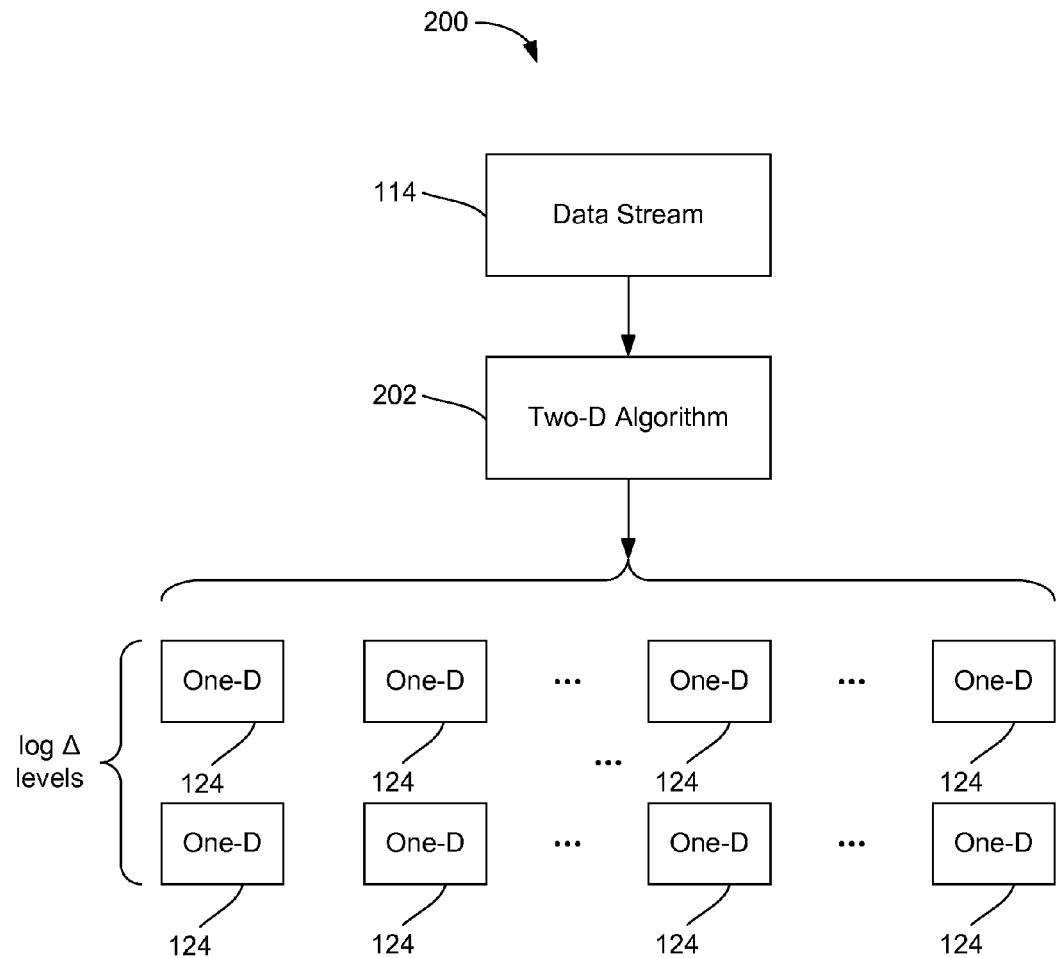
FIG. 2 depicts a flowchart diagram of one embodiment of a method for estimating aggregates over a stream of axis-aligned rectangles.

FIG. 2 depicts a flowchart diagram of one embodiment of a method 200 for estimating aggregates over a stream of axis-aligned rectangles 116. Although the method 200 is described in conjunction with the aggregate approximation system 100 of FIG. 1, embodiments of the method 200 may be implemented with other types of aggregate approximation systems 100.

In one embodiment of the method, the aggregate approximation system 100 receives a data stream 114 represented by a plurality of axis-aligned rectangles 116. The axis-aligned rectangles 116 may be used to represent geometric data in the data stream 114. The system 100 may process the data stream 114 to obtain an estimate of the volume of the rectangles 116 in the data stream 114. To process the data stream 114, the system 100 first assumes that the coordinates of each rectangle 116 are located in a grid 120 of predetermined area. The system 100 processes the data stream 114 using a multi-dimensional algorithm 202. In one embodiment, the multi-dimensional algorithm 202 includes assigning intervals 118 in the rectangles 116 to buckets 124 in multiple levels based on the position of the rectangles 116 in the grid 120. In one embodiment, the number of levels is at most $\log \Delta$, where $\Delta$ is the number of rows/columns in the grid 120. The multi-dimensional algorithm 202 also includes using pairwise-independent hash functions 128 to find buckets 124 having intervals 118 that meet a predetermined threshold. The intervals 118 that meet the threshold are then inserted into one-dimensional algorithms 126 maintained in the corresponding buckets 124, and the system 100 may calculate the volume of the rectangles 116 using the data from the buckets 124.

Figure 3:
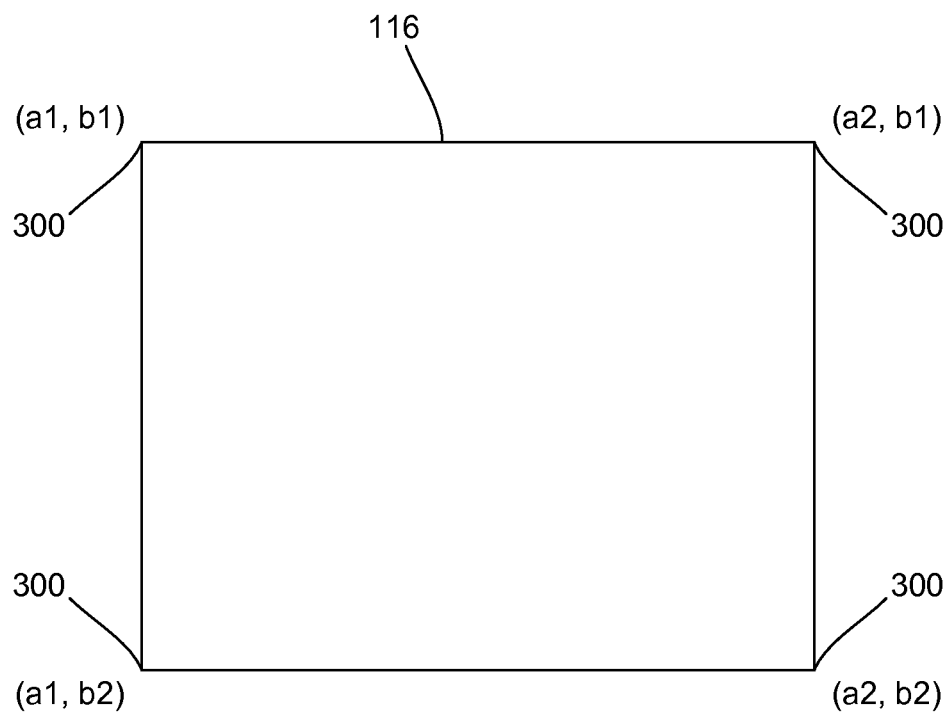
FIG. 3 depicts a schematic diagram of one embodiment of a rectangle in a stream of data.

FIG. 3 depicts a schematic diagram of one embodiment of a rectangle 116 in a stream 114 of data. In one embodiment, all vertices 300 of the rectangle 116 are included in the grid 120 of predetermined area as described herein. The grid 120 may be any size required to fit the rectangles 116 in the data stream 114 within the boundaries of the grid 120. The coordinates for the vertices in each rectangle 116 may be used in the multi-dimensional algorithm 202 to determine the heavy intervals 118 and buckets 124. Each rectangle 116 may be any size to approximate the data in the data stream 114. In one embodiment, the x coordinates for each rectangle 116 are represented by $(a_1, a_2)$, and the y coordinates are represented by $(b_1, b_2)$.

FIG. 4 depicts flowchart diagram of one embodiment of a method 400 for estimating aggregates over a stream of axis-aligned rectangles 116. Although the method 400 is described in conjunction with the aggregate approximation system 100 of FIG. 1, embodiments of the method 400 may be implemented with other types of aggregate approximation systems 100.

In one embodiment, the method includes decomposing 410 a stream 114 of data represented by a plurality of axis-aligned rectangles 116 along one-dimensional intervals 118. The data stream 114 may be received 405 in an online manner, in some embodiments, such that the system 100 processes the data stream 114 in one pass. The vertices for each rectangle 116 may be located in a grid 120 having a predetermined area. In one embodiment, decomposing the stream 114 of data includes imposing the grid 120 on the axis-aligned rectangles 116 and shifting the rectangles 116 to fit to the grid points.

In one embodiment, the system 100 assigns 415 each row 122 in the grid 120 to one of a plurality of buckets 124 prior to receiving the data stream 114, or prior to estimating the volume of the union of rectangles 116 that represent the data stream 114. In one embodiment, assigning the grid rows 122 to buckets 124 includes sub-sampling each row 122 to a plurality of levels and then randomly hashing the sub-sampled rows 122 into the plurality of buckets 124. The number of levels into which the rows 122 are sub-sampled may be based on the number of grid rows 122. In one embodiment, the number of buckets 124 is based on the number of rows 122 in the grid 120, and may be approximately $\log \Delta$ in each level, where $\Delta$ is the number of rows 122 in the grid 120, such that the number of buckets 124 is constant for the grid 120.

The one-dimensional intervals 118 for each rectangle 116 are placed 420 into the buckets 124 according to the corresponding grid rows 122 in which the one-dimensional intervals 118 are positioned. The system 100 may maintain an instance of a one-dimensional algorithm 126 in each bucket 124. The one-dimensional algorithm 126 may be used to process one-dimensional intervals 118 to determine an area of a union of one-dimensional intervals 118. The one-dimensional algorithm 126 may be a known data structure for processing one-dimensional intervals 118.

In one embodiment, the system 100 determines 425 if an interval 118 for a given bucket 124 meets a predetermined threshold. The threshold may be determined based on results from pairwise-independent hash functions 128 for the interval 118. The hash functions 128 may be part of a multi-dimensional algorithm 202 to determine the number of heavy buckets 124. Intervals 118 having hash function results that meet the predetermined threshold are then inserted 435 into the one-dimensional algorithm 126 maintained for the corresponding bucket 124. In one embodiment, rows 122 in the grid 120 that have hash function results below the predetermined threshold may be rejected or otherwise ignored 430 by the system 100. The multi-dimensional algorithm 202 and the one-dimensional algorithm 126 for each bucket 124 allows the system 100 to estimate 440 the sum of the number of grid points touched by at least one of the rectangles 116 in each row 122 of the grid 120 to approximate the volume of the axis-aligned rectangles 116. In one embodiment, inserting the interval 118 into the one-dimensional algorithm 126 includes updating a sketch for a zeroth frequency moment for the corresponding bucket 124.

One embodiment of the systems and methods described herein is presented below. The systems and methods described herein yield streaming algorithms for estimating the frequency moments—$F_k$, k>0—on a stream of axis-aligned rectangles 116 or other constant-dimensional axis-aligned box with space and time optimal up to small factors.

In one embodiment, the system 100 first transforms the problem so that input rectangles 116 are assumed to have vertices in a delta by delta ($\Delta \times \Delta$) grid 120. The system 100 then estimates the sum of the number of points touched by at least one rectangle 116 in each row 122 of the grid 120. The system 100 estimates the cascaded norm $l_1(X)$ of A, where A is a $\Delta \times \Delta$ binary matrix indicating which points occur in at least one input rectangle 116 in the stream. The cascaded norm is defined as $$\sum_{i=1}^{\Delta} \|A_i\|_x$$

where Ai denotes the i-th row 122 of A, and X is an arbitrary norm. This estimation is possible in the general turnstile model, where entries of A are updated an arbitrary number of times.

This estimation may be done up to a constant factor in space that is proportional to the space $s(X)$ of sketching the X-norm up to a constant factor. The cascaded norm may be estimated up to a $1+\epsilon$ factor with space $O^*(1)$. By sub-sampling rows 122 of A into log $\Delta$ levels, where roughly $\Delta/2^i$ rows 122 are sub-sampled at the i-th level. The sub-sampled rows 122 may be randomly hashed into $O^*(1)$ buckets 124, maintaining a sketch of the X-norm of the vector sum in a bucket 124 of rows 122 hashed to the bucket 124. The estimator may proceed by finding buckets 124 with large X-norm, using these to obtain an estimate gj on the size of each group $$G_j = \{A_j \mid \|A_j\|_x \in [(1+\epsilon)^j, (1+\epsilon)^{1+j}]\},$$

and outputting $$\sum_j g_j (1+\epsilon)^j.$$

The rows 122 of matrix A correspond to the lines parallel to the x-axis in the $\Delta \times \Delta$ grid 120. The system 100 may then compute the cascaded norm for the zeroth frequency moment, $F_0$, where each row 122 may be updated multiple times if some of its coordinates occur in multiple rectangles 116. Because $F_0$ obeys the triangle inequality in insertion-only streams, existing data structures may be used with minor modifications to estimate $l_1(F_O)$ of A up to $1+\epsilon$. Because $F_0$ may also be sketched using $O(\epsilon^{-2}+\log \Delta)$ bits of space, an overall algorithm using $O^*(1)$ bits of space may be obtained.

This approach may be adapted to achieve $O^*(1)$ worst-case update time per input rectangle 116. Instead of seeing one rectangle 116 at a time, the system 100 sees rows of input rectangles 116, i.e., one-dimensional intervals 118, one at a time in the data stream 114. Then for the row 122 in the $\Delta \times \Delta$ grid 120 to which the interval 118 belongs, the at-most log $\Delta$ levels it is sub-sampled to may be found. In each such level, the identity of the bucket 124 to which the interval 118 hashes may also be computed. The system 100 is then able to exploit a fast algorithm for range-efficient $F_0$, which, given an interval $[a,b] \subseteq [\Delta]$ of x-coordinates, can update a sketch for $F_0$ using only $O^*(1)$ space and time. This leads to an algorithm with update time proportional to the height of the input rectangle 116 (up to a $O^*(1)$ factor), since an interval 118 may be fed for each of the rows it intersects. This update time may be still be as large as $\Delta$.

If the hashing of rows 122 of into buckets 124 in a given level i of sub-sampling is sufficiently random, then any fixed set S of w log $\Delta$ sub-sampled rows 122 will, with very high probability, have the property that every bucket 124 in the i-th level contains a row 122 in S that hashes to that bucket 124, since there are only $w=O^*(1)$ buckets 124. Consequently, for $|S|>w \log \Delta$, the system 100 may update the $F_0$-sketches of all buckets 124 in the i-th level by the same interval [a,b] of x-coordinates corresponding to the input rectangle 116. The system 100 may quickly determine if $|S|>w \log \Delta$ by using a range efficient $F_0$ algorithm on the interval [c,d] of y-coordinates corresponding to the input rectangle 116. This is because sub-sampling may be implemented by a pairwise-independent hash function. If, on the other hand, $|S|<w \log \Delta$, an algorithm for determining the set S by extending techniques for range-efficient $F_0$ may be used. The system 100 may then update the buckets 124 in the i-th level, for each level i, to which an element of S hashes, as described herein. This gives an overall $O^*(1)$ space and update time.

The system 100 may extend these principles to d>2 dimensions by replacing the sketch maintained in the buckets 124 with the space and time efficient sketch for (d-1)-dimensional rectangles 116 that have been computed. To extend this to estimating $F_k$, k>0, a range-efficient $F_k$ may be used in each of the buckets 124. By determining if a row in an input rectangle 116 lands in a bucket 124 in a certain level of sub-sampling, as well as how many rows land in each bucket 124, the sketch maintained in the bucket 124 may be updated by the appropriate multiplicity. If the rectangle 116 has a sufficient number of rows, the number of rows that land in each bucket 124 for a given level of sub-sampling is tightly concentrated. Thus, rather than computing the number, the system 100 may replace the number by its expectation. Additionally, by setting the parameters of the data structure appropriately, the noise incurred by these operations does not significantly affect the estimate.

The system 100 may also be used for streams of other objects that can be approximated by a union of $O^*(1)$ axis-aligned rectangles 116. Such objects include the important class of rectilinear polygons with $O^*(1)$ vertices, which are polygons whose sides are parallel to the axes. These polygons are important for the representation of shapes in integrated circuit mask layouts, for example. 2-dimensional shapes such as circles, axis-aligned ellipses, and regular polygons with $O^*(1)$ vertices admit a decomposition into $O^*(1)$ axis-aligned rectangles 116, such that the volume of the union of the rectangles 116 is within a $1 \pm \epsilon$ factor of the volume of the union of the original shapes.

Pseudocode and algorithms according to one embodiment of the system 100 are described below.

MultiSketch Pseudocode

1. Initialize an $s \times \Delta'$ sketching matrix S for $(\lambda/4, 1/\Delta^2)$-$F_k$-estimation. Let $\Phi$ be the corresponding estimation procedure given a sketch Sy for a vector y.
2. $t := 2 \log \Delta$.
3. For each $x \in [t]$ and each $j \in \{0,1,2,...,\log \Delta - 1\}$,
   a. Let $B_{x,j}$ be the output of ALG on input A restricted to rows in $I_{x,j}$.
   b. Independently assign a pairwise-independent function $f_{x,j}$: $[\Delta] \rightarrow [\Delta]$.
      Let $I_{x,j} = \{i \in [\Delta] \mid f_{x,j}(i) \leq \Delta/2^j\}$.
   c. Create t hash tables, denoted $H^{(x,j,u)}$ for $u \in [t]$, each with w cells, and independently assign to them 6 log $\Delta$-wise independent functions $g_{x,j,u}: [\Delta] \rightarrow [w]$.
   d. For each $u \in [t]$ and $v \in [w]$,
      $H_v^{(x,j,u)} := \Sigma_{i \in [\Delta]} x[i \in I_{x,j}] \cdot x[g_{x,j,u}(i) = v] \cdot S \cdot A_i$.

Reconstruct Pseudocode

1. Choose $\zeta \in [0, \gamma]$ uniformly at random.
2. For each $x \in [t]$, each $j \in \{0, 1, 2, \ldots, \log \Delta - 1\}$, and each $i \in [\Delta]$,
   Let $F_k^{x,j}(A_i) = \text{median}_{u \in [t]} \Phi(H_{g_{x,j,u}(i)}^{(x,j,u)})$.
3. If $F_k^{x,j}(A_i) < \dfrac{4\varepsilon^3 B_{x,j}}{1800 \cdot \Psi \cdot (z+1) \cdot t^2 \cdot \log^3 \Delta}$, then set $F_k^{x,j} = 0$.
4. Let TOP be the set of indices I for which $F_k^{1,0}(A_i) > 0$. Let LTOP be the set of l for which there is an I in TOP for which $F_k^{1,0}(A_i) \in [\zeta(1+\gamma)^l, \zeta(1+\gamma)^{l+1}]$.
5. $Z := \log_{1+\gamma}(M/\zeta)$.
6. For each $x \in [t]$ and each $l \in \{1, 2, \ldots, Z\}$,
   a. If there exists j for which there are at least $20\varepsilon^{-2} t \log \Delta$ indices i with $F_k^{x,j}(A_i) \in [\zeta(1+\gamma)^l, \zeta(1+\gamma)^{l+1}]$,
      i. Let j(x, l) be the largest such j.
      ii. Let c(x, l) be the number of i with $F_k^{x,j}(A_i) \in [\zeta(1+\gamma)^l, \zeta(1+\gamma)^{l+1}]$.
      iii. Else, $s_{x,l} := 0$.
7. $s_l := \text{median}_{x \in [t]} s_{x,l}$.
8. Output $\sum_{i \in TOP} F_k^{1,0}(A_i) + \sum_{l \in LTOP} s_l \cdot \zeta \cdot (1+\gamma)^l$.

Range-Minimum Algorithm

Input: a, d, n, M are non-negative integers; Start Value $0 \leq a < M$;
   Common Difference $0 < d < M$; Number of elements $n > 0$;
   Sequence $S = \{(a + (i-1) \cdot d) \mod M \mid 1 \leq i \leq n\}$;
Output: The $\kappa$ minimum elements in S
if $n < 2\kappa$ then
   Compute S explicitly; Return $\kappa$ smallest elements in S.
end
Compute $f_1$, the first element in $S_1$ and k, the number of times the sequence S crosses the origin.
if (M mod d) = 0 then
   Return $\kappa$ copies of $f_1$.
end
if $k < \kappa$ then
   Select j such that $\cup_{i=0}^j F^i$ has at least $\kappa$ elements, and $\cup_{i=0}^{j-1} F^i$ has less than $\kappa$ elements. Return the $\kappa$ smallest elements in $S_0 \cup (\cup_{i=0}^j F^i)$.
end if $(d - (M \mod d)) \leq \dfrac{d}{z}$ then
   if (a < d) then
      Return Range-Minimum($f_0$, (d - M mod d), k + 1, d, $\kappa$)
   else
      Return Range-Minimum($f_1$, (d - M mod d), k, d, $\kappa$)
   end
else

Range-Minimum Algorithm -continued

/ * (M mod d) $\leq \dfrac{d}{z}$
If (a < d) then
   Return Range-Minimum($f_k$, (d - M mod d), k + 1, d, $\kappa$)
else
   Return Range-Minimum($f_k$, (d - M mod d), k, d, $\kappa$)
end
end

2-Dimensional Klee Pseudocode

1. Initialize data structures for MULTISKETCH and RECONSTRUCT with the sketching matrix S for range-efficient estimation of $F_0$.
2. For $x \in [t]$, $j \in \{0,1,2,..., \log \Delta - 1\}$ and $u \in [t]$, let $g_{x,j,u}: [\Delta] \rightarrow [w]$ be the associated 6 log $\Delta$-wise hash functions, and let $f_{x,j}: [\Delta] \rightarrow [\Delta]$ be the associated pairwise-independent hash functions, which can be viewed as $f_{x,j}(y) = \alpha_j y + \beta_j \mod \Delta$.
3. Given an input rectangle $r = [a_1, b_1] \times [a_2, b_2]$,
   a. For each $x \in [t]$ and each $j \in \{0,1,2,..., \log \Delta - 1\}$,
      i. Run RANGE-MINIMUM on the sequence $\{(\beta_j + \alpha_j a_1) + (i-1) \cdot \alpha_j \mod \Delta \mid 1 \leq i \leq b_1 - a_1 + 1\}$, with parameter $\kappa := 72w \log \Delta + 1$
      ii. Let S be the set of $\kappa$ smallest elements, as returned by RANGE-MINIMUM.
      iii. If $|S \cap I_{x,j}| \geq \kappa$, then feed the update $[a_2, b_2]$ to each of the w buckets for each $u \in [t]$
      iv. Else, for each $u \in [t]$ and $s \in S$, feed the update $[a_2, b_2]$ to the bucket $g_{x,j,u}(s)$ in $H^{(x,j,u)}$.
4. At the end of the stream, output the estimator given by RECONSTRUCT.

An embodiment of an aggregate approximation system 100 includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

It should also be noted that at least some of the operations for the methods may be implemented using software instructions stored on a computer usable storage medium for execution by a computer. As an example, an embodiment of a computer program product includes a computer usable storage medium to store a computer readable program that, when executed on a computer, causes the computer to perform operations, including an operation to estimate aggregates over a stream of axis-aligned rectangles 116.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-usable or computer-readable medium can be an electronic, magnetic, optical, electromagnetic, infrared, or semiconductor system (or apparatus or device), or a propagation medium. Examples of a computer-readable storage medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer program product, comprising:
a non-transitory computer readable storage medium to store a computer readable program, wherein the computer readable program, when executed by a processor within a computer, causes the computer to perform operations for estimating aggregates over a stream of axis-aligned rectangles, the operations comprising:
decomposing a stream of data represented by a plurality of axis-aligned rectangles along one-dimensional intervals, wherein all vertices for each rectangle are located in a grid having a predetermined area;
assigning each row in the grid to one of a plurality of buckets, wherein the one-dimensional intervals for each rectangle are placed into the buckets according to the corresponding rows in which the one-dimensional intervals are positioned;
maintaining an instance of a one-dimensional algorithm in each bucket; and
estimating a sum of a number of grid points touched by at least one of the rectangles in each row of the grid to approximate a volume of the axis-aligned rectangles by:
using pairwise-independent hash functions in a multi-dimensional algorithm to determine buckets that include an interval corresponding to a given rectangle, wherein the interval has hash function results that meet a predetermined threshold; and
inserting the interval for the rectangle into the one-dimensional algorithm for the corresponding bucket having hash function results that meet the predetermined threshold.

2. The computer program product of claim 1, wherein assigning each row in the grid further comprises:
subsampling each row in the grid into a plurality of levels; and
randomly hashing the subsampled rows into the plurality of buckets.

3. The computer program product of claim 2, wherein subsampling each row further comprises subsampling the rows into a number of levels based on a number of rows in the grid.

4. The computer program product of claim 1, wherein a number of buckets is constant based on a number of rows in the grid.

5. The computer program product of claim 1, wherein inserting the interval for the rectangle corresponding to the one-dimensional interval into the one-dimensional algorithm for the corresponding bucket further comprises updating a sketch for a zeroth frequency moment for the corresponding bucket.

6. The computer program product of claim 1, wherein using the pairwise-independent hash functions further comprises rejecting rows in the grid that comprise hash function results below the predetermined threshold.

7. The computer program product of claim 1, wherein decomposing the stream of data further comprises:
imposing the grid on the axis-aligned rectangles; and
shifting the rectangles to fit to the grid points.

8. A method for estimating aggregates over a stream of axis-aligned rectangles, comprising:
decomposing a stream of data represented by a plurality of axis-aligned rectangles along one-dimensional intervals, wherein all vertices for each rectangle are located in a grid having a predetermined area;
assigning each row in the grid to one of a plurality of buckets, wherein the one-dimensional intervals for each rectangle are placed into the buckets according to the corresponding rows in which the one-dimensional intervals are positioned;
maintaining an instance of a one-dimensional algorithm in each bucket; and
estimating a sum of a number of grid points touched by at least one of the rectangles in each row of the grid to approximate a volume of the axis-aligned rectangles by:
using pairwise-independent hash functions in a multi-dimensional algorithm to determine buckets that include an interval corresponding to a given rectangle, wherein the interval has hash function results that meet a predetermined threshold; and
inserting the interval for the rectangle into the one-dimensional algorithm for the corresponding bucket having hash function results that meet the predetermined threshold.

9. The method of claim 8, wherein assigning each row in the grid further comprises:
subsampling each row in the grid into a plurality of levels; and
randomly hashing the subsampled rows into the plurality of buckets.

10. The method of claim 9, wherein subsampling each row further comprises subsampling the rows into a number of levels based on a number of rows in the grid.

11. The method of claim 8, wherein a number of buckets is constant based on a number of rows in the grid.

12. The method of claim 8, wherein inserting the interval for the rectangle corresponding to the one-dimensional interval into the one-dimensional algorithm for the corresponding bucket further comprises updating a sketch for a zeroth frequency moment for the corresponding bucket.

13. The method of claim 8, wherein using the pairwise-independent hash functions further comprises rejecting rows in the grid that comprise hash function results below the predetermined threshold.

14. The method of claim 8, wherein decomposing the stream of data further comprises:
  imposing the grid on the axis-aligned rectangles; and
  shifting the rectangles to fit to the grid points.

15. An aggregate approximation system, comprising:
  a receiver configured to receive a stream of data represented by a plurality of axis-aligned rectangles along one-dimensional intervals;
  a volume estimator configured to:
    decompose the stream of data, wherein all vertices for each rectangle are located in a grid having a predetermined area;
    assign each row in the grid to one of a plurality of buckets, wherein the one-dimensional intervals for each rectangle are placed into the buckets according to the corresponding rows in which the one-dimensional intervals are positioned;
    maintain an instance of a one-dimensional algorithm in each bucket; and
    estimate a sum of a number of grid points touched by at least one of the rectangles in each row of the grid to approximate a volume of the axis-aligned rectangles by:
      using pairwise-independent hash functions in a multi-dimensional algorithm to determine buckets that include an interval corresponding to a given rectangle, wherein the interval has hash function results that meet a predetermined threshold; and
      inserting the interval for the rectangle into the one-dimensional algorithm for the corresponding bucket having hash function results that meet the predetermined threshold.

16. The system of claim 15, wherein assigning each row in the grid further comprises:
  subsampling each row in the grid into a plurality of levels; and
  randomly hashing the subsampled rows into the plurality of buckets.

17. The system of claim 16, wherein subsampling each row further comprises subsampling the rows into a number of levels based on a number of rows in the grid.

18. The system of claim 15, wherein inserting the interval for the rectangle corresponding to the one-dimensional interval into the one-dimensional algorithm for the corresponding bucket further comprises updating a sketch for a zeroth frequency moment for the corresponding bucket.

19. The system of claim 15, wherein using the pairwise-independent hash functions further comprises rejecting rows in the grid that comprise hash function results below the predetermined threshold.

20. The system of claim 15, wherein decomposing the stream of data further comprises:
  imposing the grid on the axis-aligned rectangles; and
  shifting the rectangles to fit to the grid points.

\* \* \* \* \*